Figure 1:
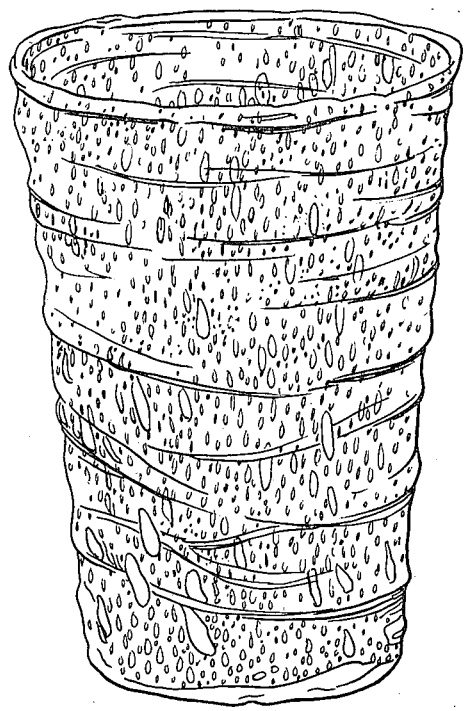

May 28, 1929.　　　R. HALEY　　　1,715,130
BUBBLE OR BLISTER GLASS
Filed Oct. 7, 1927　　　2 Sheets-Sheet 1

INVENTOR.
Reuben Haley
BY Green and McAlpster
His ATTORNEYS.

May 28, 1929.  R. HALEY  1,715,130
BUBBLE OR BLISTER GLASS
Filed Oct. 7, 1927  2 Sheets-Sheet 2

INVENTOR.
Reuben Haley
BY Green & McCallister
His ATTORNEYS.

Patented May 28, 1929.

1,715,130

UNITED STATES PATENT OFFICE.

REUBEN HALEY, OF BEAVER, PENNSYLVANIA.

BUBBLE OR BLISTER GLASS.

Application filed October 7, 1927. Serial No. 224,621.

This invention relates to glass articles and more particularly to blown articles of blister or bubble glass and to a method of making the same.

Blister or bubble glass as used in this application refers to that glass in which blisters or bubbles are intentionally formed in order to give to the glass articles the appearance of being old or antique. Numerous methods of making such bubbles or blisters in glass have been practiced for some time but so far as I know, in none of these methods is it possible to determine just where the blisters or bubbles will occur. They may occur close to the inner surface or the outer surface of the ware and in fact, they may break through either of these surfaces causing a loss, or the walls between the blisters and either the interior or exterior surface may be so thin as to render the article unusable.

An object of this invention is to produce blown articles of bubble or blister glass in which the blisters or bubbles are located substantially midway between the inner and outer surfaces of the articles and a further object of this invention is to provide a method whereby such ware may be readily, easily and cheaply manufactured.

These, as well as other objects which will appear to those skilled in this particular art, I attain by means of the article and the method of making the same described in the specification and diagrammatically illustrated in the drawings accompanying and forming part of this application.

Figure 2:
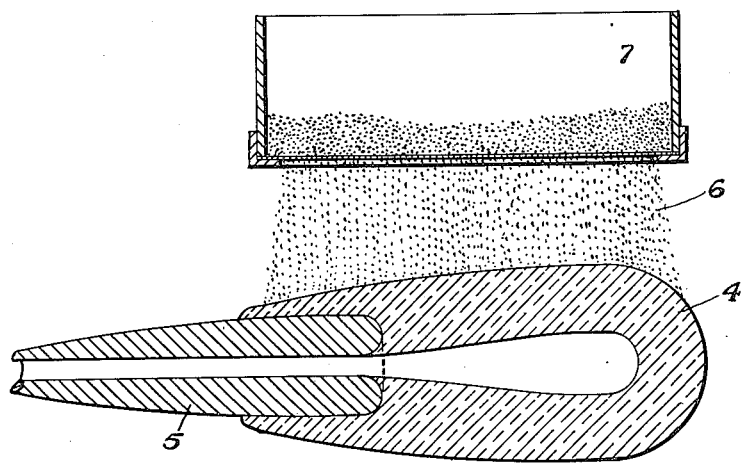
Figure 3:
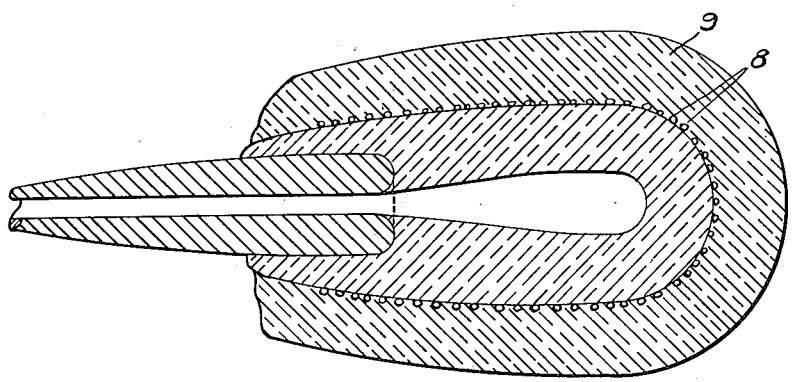

Figure 1 of the drawings is a view in perspective of a hollow blown glass article such as a vase embodying this invention and Figures 2 and 3 illustrate in a diagrammatic way certain steps of the method used in making the article of Figure 1.

In practicing this method in the making of hollow glass articles embodying this invention, I first gather on the end of a blowpipe in the usual way a core of molten glass of about one half the weight of the finished article. This is blocked in order to make it true and round. I then sift onto this rounded molten or partially molten core a sufficient amount of finely divided bubble or blister forming material to form the desired number of blisters or bubbles in the finished ware. When this core or ball is sufficiently chilled, I encase this with molten glass by gathering over this a quantity of molten glass sufficient to make, with the core, the completed article.

This duplex gather is then blocked, manipulated and blown to the shape required to form the completed article.

The heat of the duplex gather is sufficient to cause each of the blister or bubble forming particles to throw off a small portion of gas (the amount depending upon the size of the particles) which causes a bubble or blister to form midway between the inner and outer walls of the gather.

The bubble or blister forming material may be any finely divided substance that will throw off a small portion of gas when subjected to the temperature of the partly molten glass. This material may be soda ash or common salt or in fact any one of a large number of substances which are well known in this art.

The material may be deposited on the core from a perforated container such as a sieve.

In Figure 1, 4 represents a core of molten or partly molten glass attached to the end of a blowpipe 5 and as it appears after it has been blown and worked into what is termed a ball. 6 represents the finely divided bubble or blister forming material in the act of being deposited on the core from a container 7 having a meshed bottom.

In Figure 3, 8 represents the bubble or blister forming material adhering to core 4 and 9 represents the second gather which surrounds or encases the core and the adhering bubble or blister forming material and with the core forms a duplex gather.

The number of blisters or bubbles is regulated by the amount of material that is sifted onto the core or ball. This material will vary somewhat in size and therefore the sizes of the blisters or bubbles will vary.

Crystal glass or glass of any color may be used in carrying out this invention.

What I claim is:—

1. The method of making blown glassware, which consists in gathering a core of molten glass on a blowpipe in depositing upon such core while still molten finely divided bubble forming material, incasing the core and bubble forming material with molten glass and then in blowing the combined gathers to form the article.

2. The method of making blown articles of bubble or blister glass in which the bubbles or blisters are located substantially midway between the inner and outer walls thereof, which consists in forming a duplex gather by gathering molten glass with bubble or blister forming material located between the several layers thereof and then in blowing or forming the duplex gather into the article.

3. The method of making a glass article, which consists in gathering a core of molten glass, in depositing thereon finely divided bubble-forming material, then in gathering an additional amount of molten glass over said core and then in blowing the combined gather to form the article.

In testimony whereof, I have hereunto subscribed my name this 26th day of September, 1927.

REUBEN HALEY.